(12) United States Patent
Sealy et al.

(10) Patent No.: US 8,756,915 B2
(45) Date of Patent: Jun. 24, 2014

(54) INTEGRATED FUEL CATALYST MONITOR

(75) Inventors: Brent Edward Sealy, Plymouth, MI (US); Jeffrey Scott Hepburn, Birmingham, MI (US); Paul Chester Dara, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1289 days.

(21) Appl. No.: 12/577,984

(22) Filed: Oct. 13, 2009

(65) Prior Publication Data

US 2011/0083425 A1 Apr. 14, 2011

(51) Int. Cl.
*F01N 3/00* (2006.01)

(52) U.S. Cl.
USPC ............... 60/277; 60/274; 60/276; 60/285

(58) Field of Classification Search
USPC .................... 60/274, 276, 277, 285, 299
See application file for complete search history.

(56) References Cited

U.S. PATENT DOCUMENTS

| 5,088,281 A | * | 2/1992 | Izutani et al. ............ 60/274 |
| 6,594,986 B2 | | 7/2003 | Ingram et al. | |
| 7,284,368 B2 | * | 10/2007 | Surnilla et al. ............ 60/285 |

* cited by examiner

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

A method is provided for monitoring an emission device coupled to an engine. In one example approach, the method comprises: following a deceleration fuel shut-off duration, indicating degradation of the emission device based on an amount of rich products required to cause a sensor to become richer than a threshold. The amount of rich products required may be correlated to an amount of oxygen stored in the emission device. The indication of emission device degradation may be further based on air mass and temperature during delivery of the required rich products.

17 Claims, 6 Drawing Sheets

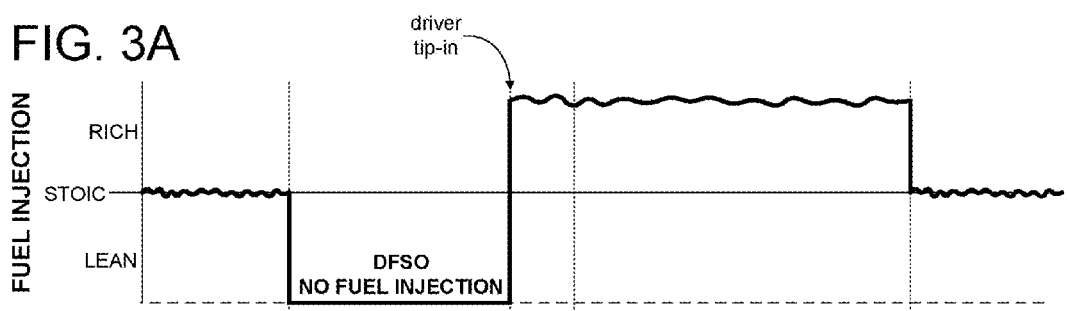
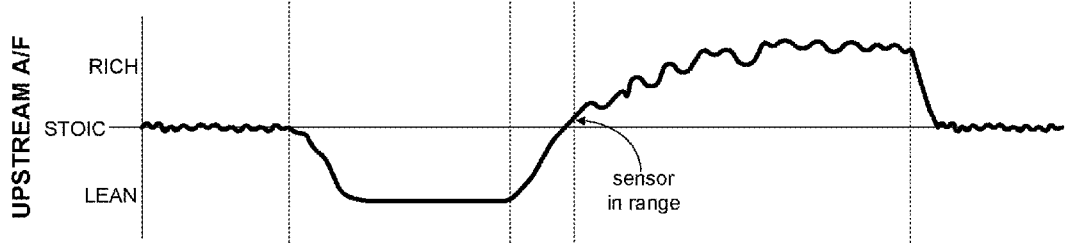
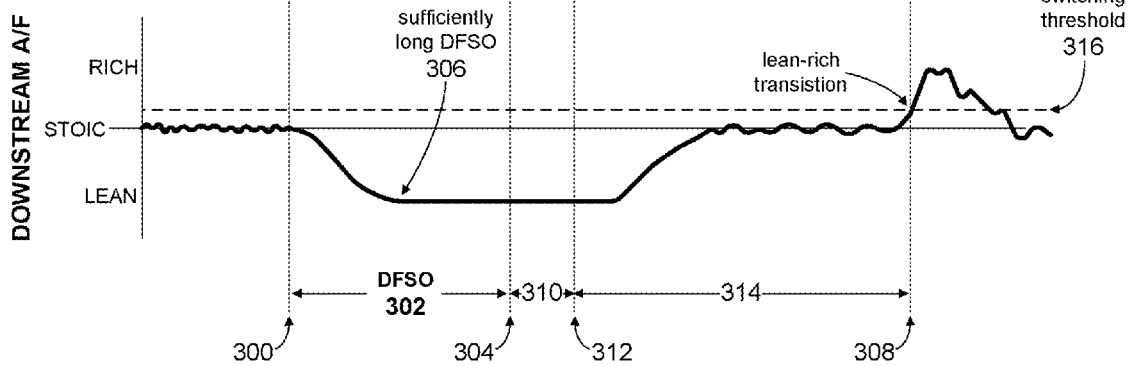

INTEGRATED FUEL CATALYST MONITOR

FIELD

The present disclosure relates to a catalyst monitoring system.

BACKGROUND AND SUMMARY

A three-way catalyst device coupled to the exhaust of a combustion engine reduces combustion by-products such as carbon monoxide, hydrocarbons, and oxides of nitrogen. However, as the catalyst device ages, its ability to store oxygen diminishes leading to a decrease in efficiency. In order to determine the efficiency of the catalyst device, systems monitor the ability of the device to store oxygen.

Various approaches, including full and partial volume monitoring sensor approaches have been developed. In one approach, as described in U.S. Pat. No. 6,594,986, monitoring of the emission control device with a lean-burn engine includes monitoring the oxygen storage capacity of the device by determining an amount of fuel required to purge the catalysts after they have been fully saturated with oxidants due to lean operation.

However, the inventors have recognized issues with such an approach. For example, lean combustion may lead to specific NOx trapping catalyst requirements that may be ineffective for lower emission regulations. Further, in such an approach, since combustion is taking place while the catalysts are saturated for monitoring, there may be a risk of catalyst oversaturation. Catalyst oversaturation may result in decreased reduction of combustion by-products.

As such, the above issued may be addressed at least partially be running a catalyst monitor following deceleration fuel shut-off (DFSO) events, as such operation may provide an advantageous starting point for monitoring the efficiency of the catalysts in an emission control device. In particular, running the monitoring routine following DFSO eliminates the need to operate the engine in a lean combustion mode in order to saturate the catalyst. Further, during DFSO no fuel is injected while the engine rotates and pumps air through the catalyst, thus catalytic saturation may occur faster and more completely than during lean engine operation, with reduced risks from oversaturation.

The inventors herein have also recognized that including compensation for air mass and catalyst temperature variations in the catalyst monitoring routine may reduce noise sources in the catalyst monitoring routine.

In one example, a method is provided for monitoring an emission device coupled to an engine. The method comprises: following a deceleration fuel shut-off duration, indicating degradation of the emission device based on an amount of rich products required to cause a sensor to become richer than a threshold. For example, the sensor may be a full volume sensor located downstream of a full volume of catalyst material. For example, the amount of rich products required to cause a sensor to become richer than a threshold may be correlated to an amount of oxygen stored in the emission device. Thus the indication of degradation of the emission device may be based on the amount of stored oxygen. The indication of emission device degradation may be further based on air mass and temperature during delivery of the required rich products to account for effects of such parameters on the indication of degradation.

In such an approach, the oxygen storage capacity may be identified via an integrated fuel metric. Furthermore, since little to no combustion occurs during DFSO when the catalysts are being saturated, the negative effects of catalyst oversaturation may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A, 3B, and 3C show example air-fuel variations of system components while monitoring an emission control system following a deceleration fuel shut-off catalyst reactivation event.

DETAILED DESCRIPTION

Figure 1:
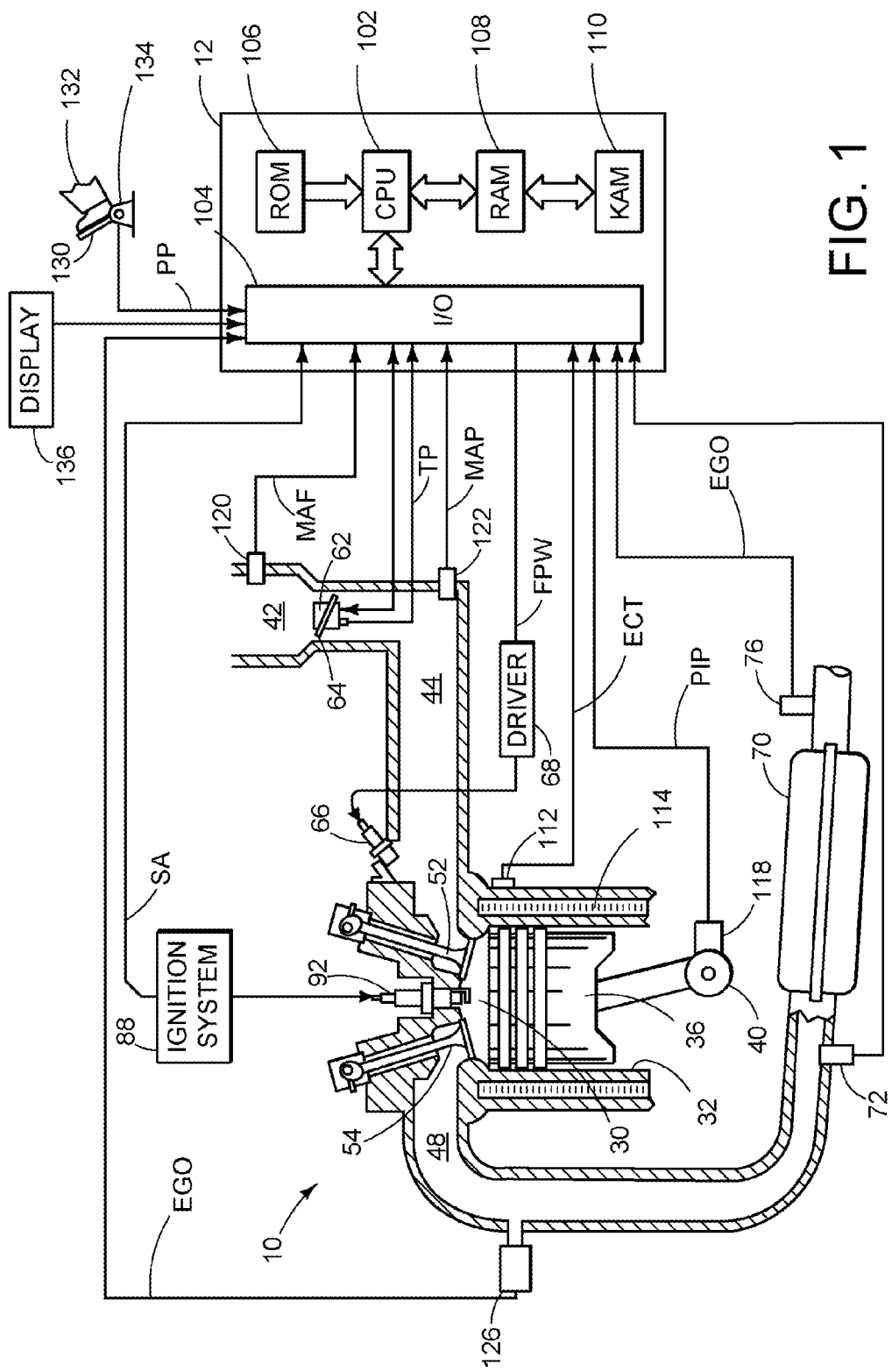
FIG. 1 shows a schematic diagram of one cylinder of multi-cylinder engine with an emission control device coupled to the engine exhaust system.

The following description relates to a system and method for monitoring an emission control system following a deceleration fuel shut-off event. FIG. 1 shows an example combustion engine with an emission control device coupled to the exhaust. The catalyst monitoring routine may be initiated following a DFSO event, in response to a driver tip-in to come out of the DFSO event. FIGS. 3A, 3B, and 3C show examples of air-fuel variations of a fuel injector, an air-fuel sensor upstream of the emission control device, and an air-fuel sensor downstream of the emission control device, respectively, during an example catalyst monitoring event. The example catalyst monitoring routine shown in FIG. 4 determines an oxygen storage capacity (OSC) of the catalysts in the emission control device based on an amount of rich products required to cause a sensor to become richer than a threshold. In one example, the sensor may be located at full volume. In another example the sensor may be located at partial volume. If the OSC is below a threshold, for example, the routine may indicate a catalyst degradation condition. Since air mass and catalyst temperature are sources of variability in the OSC calculation, air mass and catalyst temperature compensation may be applied to the OSC calculation as shown in the examples of FIGS. 5 and 6.

Turning to FIG. 1, a schematic diagram showing one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. A temperature sensor 72 may be disposed upstream of emission control device 70 to monitor the temperature of the exhaust gas entering the emission control device. It should be understood that the sensor locations shown in FIG. 1 are just one example of various possible configurations. For example, the emission control system may include a partial volume set-up with close coupled catalysts.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Additionally, controller 12 may communicate with a cluster display device 136, for example to alert the driver of faults in the engine or exhaust aftertreatment system.

Storage medium read-only memory 106 can be programmed with computer readable data representing instructions executable by processor 102 for performing the methods described below as well as other variants that are anticipated but not specifically listed.

Figure 2:
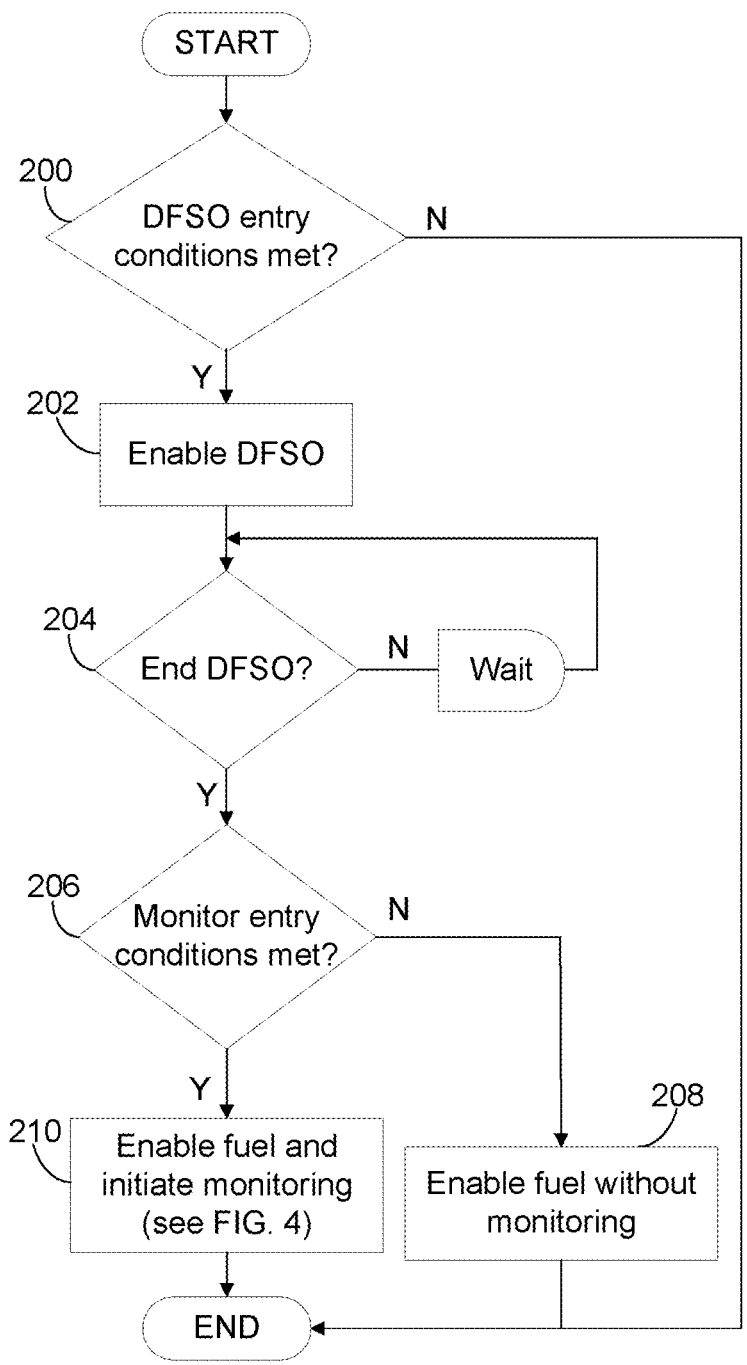
FIG. 2 shows an example routine for initiating catalyst monitoring following a deceleration fuel shut-off duration.

Turning now to FIG. 2, an example routine is shown for initiating catalyst monitoring following a DFSO duration. The engine may be operated substantially at stoichiometry before a DFSO event. At 200, the routine determines whether DFSO entry conditions are met. DFSO entry conditions may be based on various vehicle and engine operating conditions. In particular, the routine may use a combination of one or more of vehicle speed, vehicle acceleration, engine speed, engine load, throttle position, pedal position, transmission gear position, and various other parameters to determine whether the DFSO entry conditions have been met at 200. In one example, the DFSO entry conditions may be based on an engine speed below a threshold. In another example, the DFSO entry conditions may be based on an engine load below a threshold. In still another example, the DFSO condition may be based on an accelerator pedal position.

If DFSO entry conditions are met at 200, the routine proceeds to 202 and enables DFSO. During DFSO, the engine is operated without fuel injection while the engine rotates and pumps air through the emission device. During this time, the catalysts in the emission control device are reactivated with oxygen.

The DFSO event may persist until conditions are met for coming out of DFSO. For example, a DFSO event may be ended based on a driver tip-in or vehicle speed reaching a threshold value. At 204, the routine determines whether conditions are met for coming out of DFSO. If conditions are not met for coming out of DFSO at 204, the routine continues to monitor various engine and vehicle operating parameters which may indicate ending the DFSO event. For example, the routine may monitor the driver pedal position. Once conditions are met for coming out of DFSO at 204, for example in response to a driver tip-in, vehicle speed reaching a threshold value, and/or engine load reaching a threshold value, the routine proceeds to 206.

At 206, the routine determines whether entry conditions are met to initiate the catalyst monitoring routine. For example, the routine may determine whether the DFSO duration was sufficiently long enough to sufficiently saturate the catalysts in the emission control device. Indicating that the DFSO event was sufficiently long enough to sufficiently saturate the catalysts may improve accuracy of the catalyst monitoring routine. For example, if the catalyst in the emission device were not sufficiently saturated before running the catalyst monitoring routine, an erroneous indication of degradation may occur. For example, if the duration of the deceleration fuel shut-off is greater than a threshold, then the routine may indicate that the DFSO event was long enough at 206. The threshold may be based on the sensor being lean at or before an end of the DFSO duration, for example. Furthermore, since no fuel is injected while the engine rotates and pumps oxygen through the emission control device, the exhaust gas exiting the engine consists substantially of oxygen. Thus saturating the catalysts in the emission control device during DFSO events may substantially reduce the risks associated with catalyst oversaturation.

If entry conditions to initiate the catalyst monitoring routine are not met at 206, for example if the DFSO event was not long enough, the routine proceeds to 208. At 208, the routine enables fueling without initiating the monitoring routine. However, if entry conditions to initiate the catalyst monitoring routine are met at 206, for example, if the DFSO event was sufficiently long enough, the routine proceeds to step 210.

At 210, fueling is enabled and the catalyst monitoring routine is initiated. The monitoring routine initiated at 210 may indicate degradation of the emission device based on a total amount of rich products required to cause a sensor to become richer than a threshold, for example. In one example, the sensor may be located at full volume. In another example, the sensor may be located at partial volume. The amount of rich products required to cause the sensor to become richer than a threshold may be correlated to an amount of oxygen stored in the emission device. Thus the indication of catalyst degradation may be based on the amount of oxygen stored in the catalysts.

The indication of catalyst degradation in the monitoring routine initiated at 210 may be further based on air mass and catalyst temperature during delivery of the required rich products. Catalyst temperature and air mass may each cause variability in the monitoring routine initiated at 210. For example, as air mass increases, the amount of time the purge fuel is present in the catalysts will decrease, leading to a decrease in the rate of reduction of the purge fuel. Also, as the temperature of the catalysts increases, the rate of reduction of the purge fuel may increase.

In one example, air mass may be based on readings from a mass air flow sensor, e.g. sensor 120 in FIG. 1. In another example, air mass may be based on one or more of a plurality of sensor readings. In still another example, air mass may be modeled based on various engine operating parameters. The catalyst temperature may be determined by one or more of a plurality of sensors disposed in the exhaust of the engine, for example. In another example, catalyst temperature may be modeled based on various engine operating parameters. Since the indication of catalyst degradation may be based on air mass and exhaust temperature, the monitoring routine may not be limited to idle only or low load conditions. For example, if a request for high speed or high load immediately follows a DFSO event which sufficiently saturates the catalysts, the catalyst monitor may still be effectively implemented due to the inclusion of air mass and catalyst temperature compensation.

FIGS. 3A, 3B, and 3C show examples of air-fuel variations of a fuel injector, an air-fuel sensor upstream of the emission control device, and an air-fuel sensor downstream of the emission control device, respectively, during an example catalyst monitoring event following a DFSO duration. The example air-fuel signals shown in FIGS. 3B and 3C may be signals from HEGO, UEGO, or any suitable exhaust gas sensors. For example, though FIG. 3B shows an example signal from a HEGO sensor, an UEGO sensor may be instead be disposed in the exhaust conduit upstream of the catalyst. In such a case, the example signal shown in FIG. 3B may be inverted.

At 300 in FIGS. 3A, 3B, and 3C, DFSO is initiated, for example as described above with regard to the routine of FIG. 2. As shown in FIG. 3A, no fuel is injected during the DFSO duration 302 while the engine rotates and pumps air through the emission device. Thus, during DFSO, the catalysts in the emission device are saturated with oxygen.

In response to a driver tip-in at 304, the engine comes out of DFSO operation. As described above, whether or not the catalyst monitoring routine is initiated depends on whether the DFSO duration 302 was long enough to sufficiently saturate the catalysts in the emission device. Sufficient saturation of the catalyst may be determined by whether the downstream air-fuel sensor reads sufficiently lean at a point at or before an end of the DFSO duration 302, for example at point 306 in FIG. 3C. For example, if the driver tip-in to come out of DFSO at 304 occurred at a point before point 306, then the catalyst monitoring would not be initiated since the catalysts are not sufficiently saturated.

In the example of FIGS. 3A, 3B, and 3C, however, the driver tip-in occurs at a point 304 when the catalysts are sufficiently saturated. Thus the catalyst monitoring routine is initiated at point 304 following the DFSO duration 302. As shown in FIG. 3A at 304, the engine is run with rich fuel injection in response to the driver tip in when the catalyst monitor is run.

The catalyst monitoring routine beginning at point 304 is used to indicate emission device degradation based on an amount of rich exhaust products delivered from the fuel injection initiation at 304 to a lean to rich downstream sensor transition at 308.

During an initial duration, indicated at 310, after re-initiation of fuel injection before the upstream air-fuel sensor is in range, the amount of rich exhaust products may be based on an estimate of exhaust air/fuel ratio independent of the upstream air/fuel sensor. For example, the estimate of exhaust air/fuel may be based on an amount of injected fuel which may be determined from fuel injector pulse-width, e.g., an integrated pulse-width converted to mass of fuel. Following the initial duration 310, when the upstream sensor is in range, for example at point 312, the amount of rich exhaust products may be based on the upstream air-fuel sensor for the remaining duration 314, of the catalyst monitoring event (e.g., based on the equations described below).

The lean-rich downstream sensor transition at 308 may be based on a variable switching threshold, shown at 316 in FIG. 3C. The switching threshold may be increased or decreased based on various engine, exhaust, and/or sensor operating parameters, for example. Once the downstream sensor transitions from lean to rich at point 308, the monitoring routine ends and the engine returns to stoichiometric operation.

Figure 4:
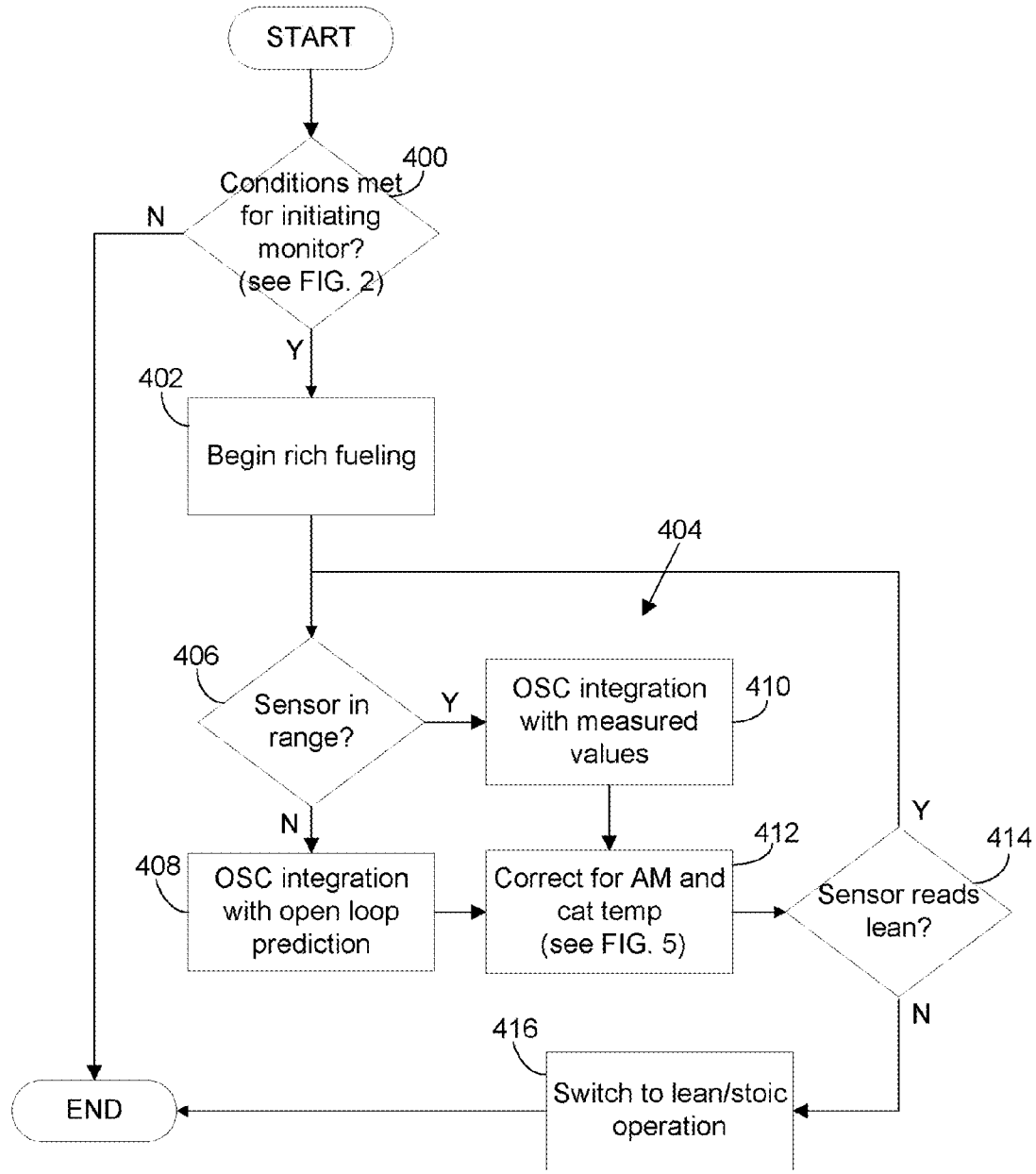
FIG. 4 shows an example routine for monitoring the emission control system following a deceleration fuel shut-off catalyst reactivation event.
Figure 5:
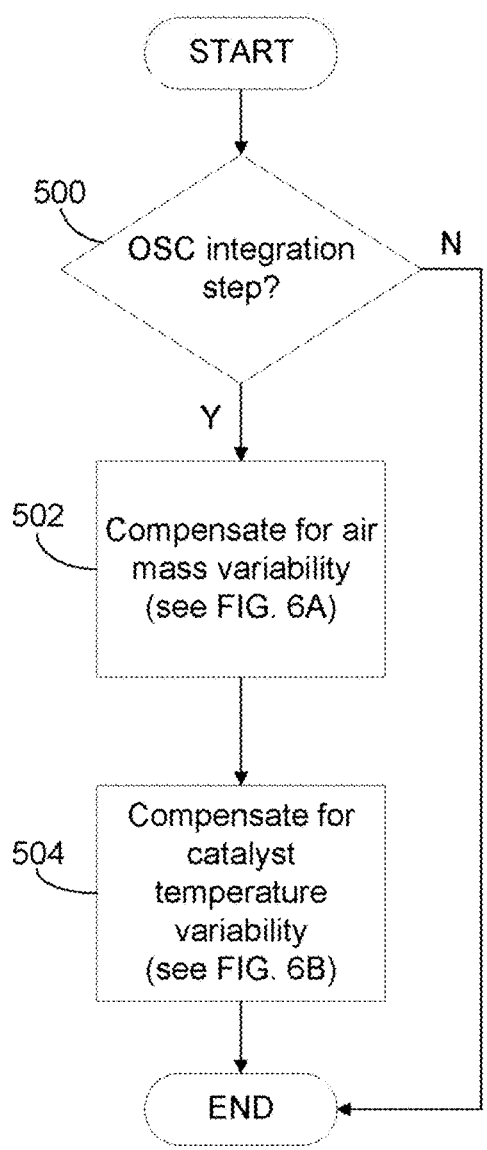
FIG. 5 shows a routine which includes compensation for air mass and catalyst temperature variability in the oxygen storage capacity integration.

Turning now to FIG. 4, an example routine is shown for monitoring an emission control system following a deceleration fuel shut-off event wherein the catalysts in the emission device are sufficiently saturated with oxygen. The routine of FIG. 4 may be employed to indicate degradation of the emission control device based on an amount of fuel required to cause a sensor to become richer than a threshold. In one example, the sensor becoming richer than a threshold may include the sensor switching from reading lean to reading rich. In another example, the sensors becoming richer than a threshold may include, the sensor switching from reading lean to reading less lean based on the threshold value. In the example routine in FIG. 4, the indication of degradation is based on an amount of oxygen stored in the emission control device following a DFSO duration, as indicated by a threshold, for example. When the DFSO duration is long enough, the catalysts in the emission control device may be sufficiently saturated with oxygen prior to the determination of the oxygen storage capacity. Sufficient saturation of the catalysts during a DFSO event may be indicated by a full-volume sensor reading lean, for example.

The oxygen storage capacity may be identified via an integrated fuel metric. Thus, in contrast to indirect monitoring approaches, detection of much smaller relative changes in catalyst activity may be achieved. The oxygen storage capacity of the emission control device may be determine by the following equation which depends on air mass (AM) and air/fuel stoichiometry ($\lambda$):

$$OSC = \int \frac{AM}{\kappa}\left(\frac{1}{\lambda} - 1\right) dt$$

The air/fuel stoichiometry ($\lambda$) in the above equation is the air/fuel stoichiometry ($\lambda$) of the exhaust entering the emission device. The air/fuel stoichiometry ($\lambda$) may be measured by an air-fuel sensor located upstream of the emission device or estimated based on an amount of fuel injected, for example. In another example, the air/fuel stoichiometry ($\lambda$) may be based on a combination of sensor readings and estimations based on various engine operating parameters. As shown in FIG. 3, for a first duration following a DFSO event, e.g., duration 310 in FIG. 3, the air/fuel stoichiometry ($\lambda$) may be based on an estimate of the exhaust air-fuel ratio, e.g. based on fuel injection amount, inducted air charge, etc. For a second duration following the first duration, e.g., duration 314 in FIG. 3, the air/fuel stoichiometry ($\lambda$) may be based on an upstream sensor.

The parameter $\kappa$, in the above equation, represents a stoichiometric air-fuel ratio. The stoichiometric air-fuel ratio $\kappa$ may depend on the type of fuel used by the engine, for example gasoline, ethanol, gasoline-ethanol blends, and methanol. For example, when the engine uses gasoline, $\kappa$=14.7. Furthermore, various modifiers may be applied to the integral to compensate for the type and composition of fuel used by the engine. For example, a modifier may be applied to the above integral to compensate for a percentage of methanol in the fuel.

The OSC integration in the above equation may be initiated following a DFSO event wherein the catalysts in the emission device are sufficiently saturated with oxygen. For example, following a DFSO duration, if the full-volume sensor reads sufficiently lean at or before an end of a DFSO duration, as determined by a threshold value indicating that the DFSO event was sufficiently long enough to saturate the catalysts, the OSC integration may be initiated and the routine of FIG. 4 implemented.

In FIG. 4, when the conditions are met for initiating the catalyst monitor at 400, the routine proceeds to 402. At 402, rich fueling is initiated in response to a driver tip-in to come out of DFSO and the OSC integration is initiated. The OSC integration, indicated generally at 404 in FIG. 3, may continue until the sensor switches from reading lean to reading rich at 414.

In one example, the lean-rich sensor transition may be based on a switching threshold. The switching threshold may be based on engine, vehicle, and/or air-fuel sensor operating conditions. For example, the switching threshold may be based on an amount of variation of the air-fuel ratio as detected by an air-fuel sensor. In another, example, the switching threshold may be based on a sensitivity of an air-fuel sensor.

The OSC integration indicated generally at 404 begins at step 406 in FIG. 4. At 406 the routine determines whether the air-fuel sensor upstream of the emission device, e.g., sensor 126 in FIG. 1, is in range. For example, during DFSO when fuel injection is cut-off, the upstream sensor reads lean. However, following DFSO when fueling is re-initiated, the upstream sensor may not immediately come back to an in range value, thus may not accurately reflect the correct air/fuel ratio. The time it takes for the sensor to come into range may be variable and may depend on various parameters. For example, sensor location, sensor aging and fuel shifts may influence the time for the sensor to provide a signal which accurately reflects the correct air/fuel ratio.

If the upstream sensor is not in range at 404, for example immediately following or soon after coming out of DFSO, the routine proceeds to 406. At 406 the routine begins the OSC integration (as described above) using adaptive fuel-based open loop prediction. For example, the air/fuel stoichiometry ($\lambda$) in the OSC equation above may be given by $\lambda = \lambda_{req}$, where $\lambda_{req}$ is the requested lambda adjusted via adaptive fuel-based open loop prediction. In one example, the adaptive fuel-based open loop prediction may be used in the OSC integration when $\lambda_{meas} > \lambda_{req} + \text{cal\_offset}$, where $\lambda_{meas}$ is the lambda measured by the upstream air-fuel sensor and cal_offset is a threshold value used to determine whether the sensor is in range. The adaptive fuel-based open loop prediction may be used until the upstream air-fuel sensor output is in range at 406. When the sensor is in range at 406, the OSC integration continues using $\lambda_{meas}$, as measured by the upstream sensor at 410.

By including adaptive fuel-based open loop prediction in the OSC integration, sensor location may be removed as a noise factor in the monitoring process. Further, the effects of sensor aging may be reduced. The remaining noise in the monitoring process may be dictated by how well the adapted the fuel control system functions. Further, sensor shift may also be reduced in such an approach.

Both integration steps using open loop prediction at 406 and measured lambda values at 408 further include compensation for variability in air mass and catalyst temperature at 410. Compensation for air mass and catalyst temperature are shown in the routine of FIG. 5 during each OSC integration step at 500. Catalyst temperature and air mass are both significant sources of variability for the integrated fuel metric described above with regard to the OSC integration equation. For example, without including the air mass compensation step at 502 in FIG. 5, the integrated fuel metric described by the equation above decreases with increasing air mass. Thus, though the OSC formula above includes air mass in the equation, it does not characterize the full effects of air mass.

For example, starting with a completely saturated catalyst (e.g., 100% stored oxygen) the rate of stored oxygen removal may drop gradually as stored oxygen is consumed. However, once all of the surface oxygen is consumed, the rate may drop rapidly because the bulk oxygen stored in the ceria of the catalysts may be more difficult to reduce. At a fixed rate of reductant delivery (e.g., constant air mass and rich lambda), when the rate of stored oxygen reduction falls below the rate of reductant delivery, the full-volume sensor may switch from reading lean to reading rich even though the stored oxygen is not completely consumed. For a given temperature, the measured amount of stored oxygen may then decrease as the rate of reductant delivery increases.

Furthermore, as the temperature of the catalysts increases, the rate of reduction of exhaust components (e.g., HC) may increase. Thus, the integrated fuel metric described by the equation above, increases with increasing catalyst temperature.

Therefore, in order to obtain a more accurate determination of the OSC for catalyst monitoring, the OSC integration may further include compensation for air mass as shown at 502 in FIG. 5, and catalyst temperature, as shown at 504 in FIG. 5. For example, compensation for air-mass and catalyst temperature may be given by the following equation:

$$OSC = \int \frac{AM}{\kappa}\left(\frac{1}{\lambda} - 1\right) \cdot FN(AM) \cdot FN(CatTemp) \cdot dt$$

The OSC multipliers FN(AM) and FN(CatTemp) in the above equation may be functions which provide air mass and catalyst temperature compensation, respectively. In one example, the OSC multipliers FN(AM) and FN(CatTemp) may be predetermined functions which depend on engine and exhaust system operating parameters. In another example, the OSC multipliers FN(AM) and FN(CatTemp) may be based on mass air flow and catalyst temperature as measured by one or more of a plurality of sensors during engine operation.

Figure 6A:
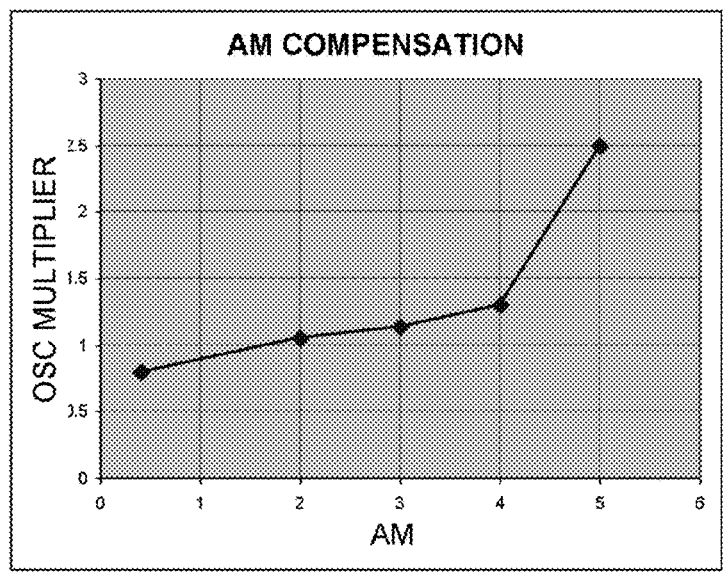
FIG. 6A shows an example function for air mass compensation.

FIG. 6A shows an example function FN(AM) for the air mass compensation OSC multiplier as a function of air mass. In this example, the OSC multiplier FN(AM) increases with increasing air mass in order to compensate for the integrated fuel metric decreasing as air mass increases, as described above. Thus the oxygen storage amount is determined to be higher based on a higher air mass.

Figure 6B:
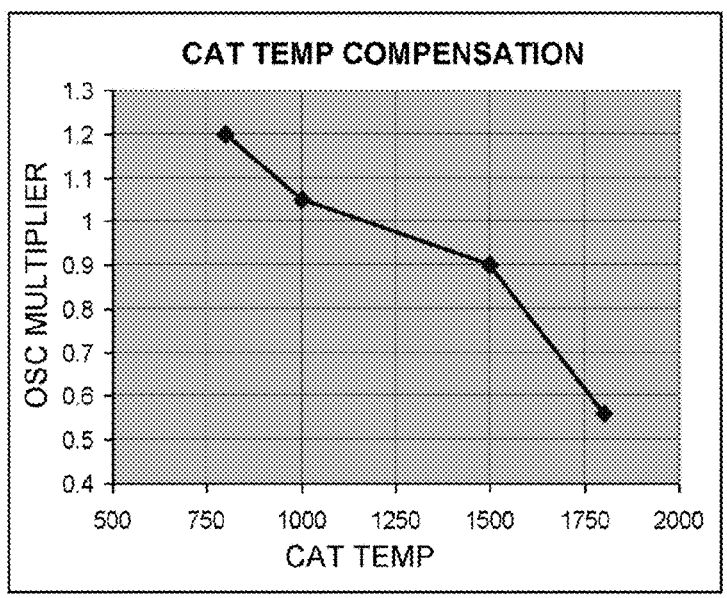
FIG. 6B shows an example function for catalyst temperature compensation.

FIG. 6B shows an example function FN(CatTemp) for the catalyst temperature compensation OSC multiplier as a function of catalyst temperature. In this example, the OSC multiplier FN(CatTemp) decreases with increasing catalyst temperature in order to compensate for the integrated fuel metric increasing as catalyst temperature increases, as described above. Thus the oxygen storage amount is determined to be lower based on a higher temperature.

Returning to FIG. 4, the OSC integration routine at 404 continues the OSC integration with air mass and catalyst temperature compensation until the sensor switches from reading lean to reading rich at 414. As described above, the sensor switch from lean to rich may be based on a switch threshold. When the sensor reads rich at 414, the OSC integration stops and the engine is switched to lean or stoichiometric operation at step 416.

If the oxygen storage capacity as determined by the routine at 404 is below a threshold, for example, then degradation of the emission control device may be indicated. The indication may occur on a cluster display to alert the driver, for example.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring an emission device coupled to an engine, comprising:
    following a deceleration fuel shut-off duration (DFSO), indicating degradation of the emission device based on an amount of rich products required to cause a sensor to become richer than a threshold, the indicating carried out when the DFSO duration is greater than a second threshold, the second threshold based on the sensor being lean at or before an end of the DFSO.

2. The method of claim 1 wherein the sensor is a full volume sensor and the threshold is substantially at stoichiometry.

3. The method of claim 1 wherein the indicating is further based on air mass during delivery of the required rich products.

4. The method of claim 1 wherein the indicating is further based on temperature during delivery of the required rich products.

5. The method of claim 1 wherein the emission device is a three-way catalyst, the method further comprising operating the engine substantially at stoichiometry before said DFSO.

6. The method of claim 1 wherein the amount of rich products required to cause the sensor to switch from lean to rich is correlated to an amount of oxygen stored in the emission device, the indicating based on the amount of oxygen stored.

7. The method of claim 6 wherein the amount of oxygen stored is based on an adaptive fuel-based open loop prediction when an upstream sensor is out of range and based on the upstream sensor when the upstream sensor is in range.

8. The method of claim 1 wherein the sensor switching from lean to rich is based on a switching threshold.

9. The method of claim 8 wherein the switching threshold is based on engine operating conditions.

10. A system for monitoring an emission control device coupled to a combustion engine, comprising:
an air-fuel sensor coupled downstream of a volume of catalyst material of the emission control device;
a control system having a computer storage medium with instructions encoded thereon, the instructions comprising:
instructions to initiate a deceleration fuel shut-off based on an engine operating condition;
following the deceleration fuel shut-off, instructions to begin fueling in response to a driver tip-in;
following the driver tip-in, instructions to indicate degradation of the emission control device based on a total amount of rich products delivered from the beginning of the fueling up to a switch of the air-fuel sensor from lean to reading rich.

11. The system of claim 10 wherein the air-fuel sensor is a full volume sensor coupled downstream of a full volume of monitored catalyst material.

12. The system of claim 10 wherein the emission control device is a three-way catalyst.

13. A method for an engine having a catalytic device and an air-fuel sensor downstream of the catalytic device, comprising:
performing a fuel shut-off event while the engine rotates and pumps air through the catalytic device, then;
re-initiating fuel injection; and
if the fuel shut-off event continued sufficiently long for the air-fuel sensor to indicate lean, indicating device degradation based on an amount of rich exhaust products delivered from the fuel injection initiation to a lean-rich sensor transition.

14. The method of claim 13, wherein the catalytic device is a three-way catalyst, and where the amount of rich exhaust products is based on an air mass and an upstream air-fuel sensor.

15. The method of claim 13 wherein, during an initial duration after re-initiation of fuel injection before an upstream air-fuel sensor is in range, the amount of rich exhaust products is based on an estimate of exhaust air/fuel ratio and independent of the upstream air-fuel sensor;
and following the initial duration, the amount of rich exhaust products is based on the upstream air-fuel sensor.

16. The method of claim 13 wherein the indicating is further based on an air mass and exhaust temperature after the point but before the lean-rich sensor transition.

17. The method of claim 16 wherein the indicating is based on an oxygen storage amount of the catalytic device, the oxygen storage amount based on the amount of rich products, the air mass, and exhaust temperature, where the oxygen storage amount is determined to be higher based on a higher air mass, and the oxygen storage amount is determined to be lower based on a higher temperature.

* * * * *